US012330268B2

(12) United States Patent
Karim et al.

(10) Patent No.: US 12,330,268 B2
(45) Date of Patent: Jun. 17, 2025

(54) APPARATUS FOR COATING REMOVAL

(71) Applicant: Yield Engineering Systems, Inc., Fremont, CA (US)

(72) Inventors: M Ziaul Karim, San Jose, CA (US); Dragan Cekic, Princeton, NJ (US)

(73) Assignee: YIELD ENGINEERING SYSTEMS, INC., Fremont, CA (US)

( * ) Notice: Subject to any disclaimer, the term of this patent is extended or adjusted under 35 U.S.C. 154(b) by 0 days.

(21) Appl. No.: 18/908,316

(22) Filed: Oct. 7, 2024

(65) Prior Publication Data

US 2025/0025987 A1 Jan. 23, 2025

Related U.S. Application Data

(62) Division of application No. 18/124,871, filed on Mar. 22, 2023, now Pat. No. 12,138,745.

(51) Int. Cl.

| | |
|---|---|
| ***B24C 1/08*** | (2006.01) |
| ***B05B 7/06*** | (2006.01) |
| ***B05B 12/18*** | (2018.01) |
| ***B24C 3/12*** | (2006.01) |
| ***B24C 5/04*** | (2006.01) |
| ***B24C 11/00*** | (2006.01) |

(52) U.S. Cl.
CPC .............. *B24C 1/086* (2013.01); *B05B 12/18* (2018.02); *B24C 3/12* (2013.01); *B24C 5/04* (2013.01); *B24C 11/00* (2013.01); *B05B 7/066* (2013.01)

(58) Field of Classification Search
CPC .. B24C 1/086; B24C 5/04; B24C 3/12; B24C 11/00; B08B 5/02; B08B 3/02; B05B 12/18; B05B 7/066
See application file for complete search history.

(56) References Cited

U.S. PATENT DOCUMENTS

| | | | |
|---|---|---|---|
| 5,688,411 | A | 11/1997 | Kutsuzawa et al. |
| 6,696,228 | B2 | 2/2004 | Muraoka et al. |
| 6,908,567 | B2 | 6/2005 | Uziel |
| 8,580,039 | B2 | 11/2013 | Saeki et al. |
| 9,656,350 | B2 | 5/2017 | Astle et al. |

(Continued)

FOREIGN PATENT DOCUMENTS

| | | | |
|---|---|---|---|
| EP | 4371149 | A1 | 5/2024 |
| JP | 2010177424 | A * | 8/2010 |

(Continued)

OTHER PUBLICATIONS

Machine Translation of WO 2019073905 to Ishii et al., Apr. 2019. (Year: 2019).*

(Continued)

*Primary Examiner* — Benjamin L Osterhout
(74) *Attorney, Agent, or Firm* — Finnegan, Henderson, Farabow, Garrett & Dunner, LLP

(57) ABSTRACT

An apparatus for removing a coating from a substrate comprises a nozzle with an inner conduit having an orifice and an outer conduit coaxially arranged about the inner conduit and defining an annular opening between the inner and outer conduits. The nozzle is configured to direct a liquid stream through the orifice toward the coated surface and direct a gas flow through the annular opening such that the gas flow surrounds the liquid stream as the liquid stream moves towards the coated surface.

20 Claims, 5 Drawing Sheets

(56) References Cited

U.S. PATENT DOCUMENTS

| | | | | |
|---|---|---|---|---|
| 11,814,983 | B2 | 11/2023 | Ruglio et al. | |
| 2005/0266777 | A1 | 12/2005 | Yoon | |
| 2006/0231119 | A1 | 10/2006 | Yi | |
| 2008/0041430 | A1 * | 2/2008 | Cho | H01L 21/67051 134/58 R |
| 2008/0106196 | A1 * | 5/2008 | Woo | H01J 9/261 313/582 |
| 2008/0230092 | A1 | 9/2008 | Ko | |
| 2009/0241995 | A1 | 10/2009 | Somervell | |
| 2010/0055924 | A1 | 3/2010 | Ganesan | |
| 2011/0048471 | A1 | 3/2011 | Kikuchi | |
| 2012/0006361 | A1 | 1/2012 | Miyagi | |
| 2012/0325274 | A1 | 12/2012 | Kai | |
| 2015/0352606 | A1 * | 12/2015 | Kubo | B08B 3/10 134/99.1 |
| 2017/0170035 | A1 | 6/2017 | Teng | |
| 2022/0170579 | A9 | 6/2022 | Kim | |

FOREIGN PATENT DOCUMENTS

| | | | | | |
|---|---|---|---|---|---|
| WO | WO-2015128591 | A1 * | 9/2015 | | B08B 3/02 |
| WO | WO-2019073905 | A1 * | 4/2019 | | B05B 7/0416 |

OTHER PUBLICATIONS

Machine Translation of WO 2015128591 to Geslot, Sep. 2015. (Year: 2015).*

Machine Translation of JP 201077424 to NIshijima, Aug. 2010. (Year: 2010).*

* cited by examiner

APPARATUS FOR COATING REMOVAL

CROSS REFERENCES TO RELATED APPLICATIONS

The present application is a divisional of U.S. Pat. No. 12,138,745, issued Nov. 12, 2024, which is incorporated herein by reference in its entirety.

TECHNICAL FIELD

The present disclosure relates to an apparatus and a method for the removal of one or more coatings from a panel.

BACKGROUND

The fabrication process of semiconductor and photonic devices is composed of many sequential steps to produce complete electrical and/or photonic circuits on a wafer or a panel (collectively referred to herein as a substrate) of a suitable material (e.g., semiconductor wafers, glass panels, etc.). Defects of any source introduced during the fabrication process reduces yield of the resulting devices. A common source of defects are the residues of coatings (e.g., deposited films, etc.) on the edge(s) of a substrate that the devices are formed on. These coating residues on the edge may be the result of incomplete removal of a coating used in the fabrication process from the edge. The substrate edge may be part of (or form), for example, the substrate bevel, substrate edge exclusion zone, handling area, etc. For example, portions of the residual coatings (e.g., metal films such as Ti, Cu, Pd, Ni, etc.) retained on the substrate may peel or delaminate during subsequent processing (e.g., deposition, heating, etc.) of the substrate and cause defects in the resulting device. Thus, processes to satisfactorily remove the coatings from the edge(s) of a substrate used in semiconductor fabrication are important.

Currently there are limited ways to remove coatings from a substrate edge. One current method uses plasma or laser ablation where a suitable laser beam (e.g., a YAG laser) is focused on the coated substrate to ablate the coating. In addition to requiring multiple passes for satisfactory coating removal, such a removal method may also result in redeposition of debris on coated surfaces (requiring subsequent cleaning steps) and result in defects. Furthermore, laser and plasma ablation tools are expensive and may require good ventilation and other protection systems for safe use. Moreover, with substrates becoming thinner (e.g., 200-250 micron), traditional laser coating removal methods risk breaking fragile panels. Additionally, some coatings (such as, for example, copper, titanium, etc.) are difficult to remove using a laser because of the large amount of energy needed for their removal.

The apparatus and methods of the current disclosure may alleviate at least some of the above-described deficiencies. However, the scope of the current disclosure is defined by the claims and not by its ability to solve any problem.

SUMMARY

Embodiments of an apparatus for coating removal and method of coating removal are disclosed.

In one embodiment, an apparatus to remove at least a portion of a coating from a coated surface of a substrate comprises at least one nozzle extending from a proximal end to a distal end, wherein at least a distal end portion of the at least one nozzle extends along a longitudinal axis inclined at an angle θ with the coated surface. The at least one nozzle may include an inner conduit having an orifice at the distal end and an outer conduit coaxially arranged about the inner conduit and defining an annular opening between the inner and outer conduits. The inner conduit may be configured to direct a liquid stream through the orifice to impinge on the coated surface and the outer conduit may be configured to direct a gas flow through the annular opening to surround the liquid stream from the orifice. The apparatus may also include an outlet port configured to direct liquid from the liquid stream away from the substrate after the liquid stream impinges the coated surface.

Various embodiments of the disclosed apparatus may additionally or alternatively include one of more of the following features: further include a heater configured to heat the liquid stream exiting the orifice; the apparatus may be configured to vary the angle θ between about 0-180°; the apparatus may be configured to vary a pressure of the liquid stream exiting through the orifice; the apparatus may be configured to vary a pressure of the gas exiting through the annular opening; the apparatus may be configured to translate the nozzle to trace a path using the liquid stream on the coated surface; the liquid stream may include a chemical composition that includes one or more of $H_2O_2$, $H_2SO_4$, SPS (sodium persulfate), and TechniEtch™ TBR19 concentrate (TBR19), and the gas flow may include air.

In another embodiment, a method of removing a coating from a coated surface of a substrate comprises positioning a nozzle of an apparatus proximate a coated surface of a substrate such that a longitudinal axis of a distal end of the nozzle is inclined at an angle θ with the coated surface. The nozzle may include an inner conduit having an orifice and an outer conduit coaxially arranged about the inner conduit and defining an annular opening between the inner and outer conduits. The method may also include directing a liquid stream through the orifice of the inner conduit toward the coated surface, and directing a gas flow through the annular opening toward the coated surface such that the gas flow surrounds the liquid stream from the orifice. The method may further include impinging the liquid stream on the coated surface to remove at least a portion of a coating of the coated surface.

Various embodiments of the disclosed method may additionally or alternatively include one of more of the following steps or features: further include directing liquid from the liquid stream away from the substrate after the liquid stream impinges on the coated surface; positioning the nozzle may include adjusting the angle θ; positioning the nozzle may include adjusting a distance of the distal end of the nozzle from the coated surface; directing the liquid stream may include adjusting a pressure of a liquid directed through the inner conduit; directing the gas flow may include adjusting a pressure of a gas directed through the outer conduit; directing the liquid stream may include directing a liquid chemical composition through the inner conduit, wherein the chemical composition may include one or more of $H_2O_2$, $H_2SO_4$, SPS (sodium persulfate), and TechniEtch™ TBR19 concentrate (TBR19); directing the gas flow may include directing air through the outer conduit; further include moving the nozzle to trace a path using the liquid stream on the coated surface; and directing the liquid stream may include heating a liquid in the liquid stream.

BRIEF DESCRIPTION OF THE DRAWINGS

The accompanying drawings, which are incorporated herein and constitute a part of this disclosure, illustrate exemplary embodiments and, together with the description, are used to explain the disclosed principles. In these drawings, where appropriate, reference numerals that illustrate the same or similar structures, components, materials, and/or elements in different figures are labeled similarly. It is understood that various combinations of the structures, components, and/or elements, other than those specifically shown, are contemplated and are within the scope of the present disclosure.

For simplicity and clarity of illustration, the figures depict the general structure of the various described embodiments. Details of well-known components or features may be omitted to avoid obscuring other features, since these omitted features are well-known to those of ordinary skill in the art. Further, features in the figures are not necessarily drawn to scale. The dimensions of some features may be exaggerated relative to other features to improve understanding of the exemplary embodiments. One skilled in the art would appreciate that the features in the figures are not necessarily drawn to scale and, unless indicated otherwise, should not be viewed as representing dimensions or proportional relationships between different features in a figure. Additionally, even if it is not expressly mentioned, aspects described with reference to one embodiment or figure may also be applicable to, and may be used with, other embodiments or figures.

DETAILED DESCRIPTION

Figure 1:
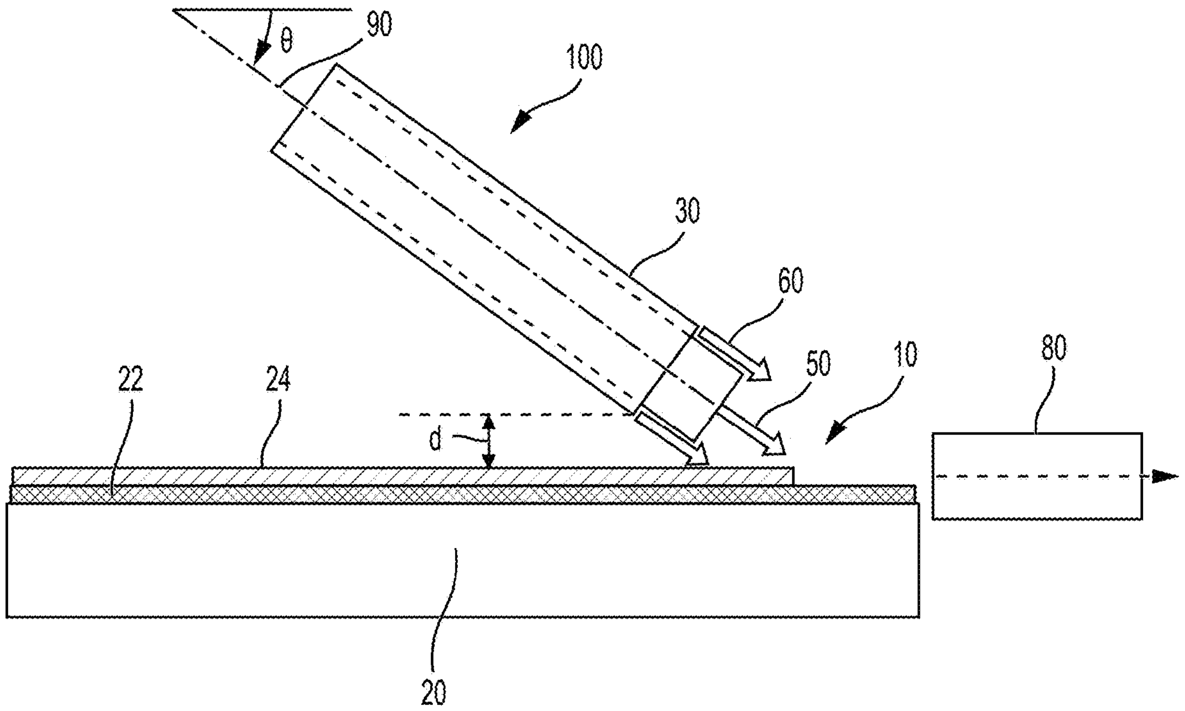
FIG. 1 is a schematic side view of an exemplary apparatus used to remove coatings from a panel.

All relative terms such as “about,” “substantially,” “approximately,” etc., indicate a possible variation of +10% (unless noted otherwise or another degree of variation is specified). For example, a feature disclosed as being about “t” units wide (or length, thickness, depth, etc.) may vary in width from (t−0.1t) to (t+0.1t) units. In some cases, the specification also provides context to some of the relative terms used. For example, a structure (e.g., a coating edge) described as being substantially linear may deviate by +10% from being linear. As another example, a feature (e.g., a coating edge, etc.) described as having a substantially sharp or substantially step-like configuration or shape (e.g., ⌊-shape, ⌉) may deviate by +10% from being perfectly step-like (e.g., a shape having rounded corners, such as, for example, ⌊, ⌊, ⌉, ⌉, etc.) Further, a range described as varying from, or between, 5 to 10 (5-10), includes the endpoints (i.e., 5 and 10).

Unless otherwise defined, all terms of art, notations, and other scientific terms or terminology used herein have the same meaning as commonly understood by persons of ordinary skill in the art to which this disclosure belongs. Some components, structures, and/or processes described or referenced herein are well understood and commonly employed using conventional methodology by those skilled in the art. These components, structures, and processes will not be described in detail. All patents, applications, published applications and other publications referred to herein as being incorporated by reference are incorporated by reference in their entirety. If a definition or description set forth in this disclosure is contrary to, or otherwise inconsistent with, a definition and/or description in these references, the definition and/or description set forth in this disclosure controls over those in references incorporated by reference. None of the references described or referenced herein is admitted as prior art relative to the current disclosure.

The discussion below describes an exemplary apparatus and method used to remove a coating from an edge (or the edge zone) of a substrate (e.g., wafer, panel, etc.). It should be noted that the specific features of the described apparatus are not limitations. Instead, embodiments of the described apparatus may be used to remove any coating(s) from any substrate in any suitable application. For example, the disclosed apparatus and method may be used to remove any type of one or more coatings (organic, inorganic, metallic, etc.) from any type of substrate (e.g., panel, wafer, base plate, etc.). In the discussion below, the term “substrate” is used broadly to refer to any component having a relatively flat surface upon which a coating is disposed (conformally, as patches, in regions, etc.). For example, as used herein, a substrate includes a plate, a panel (e.g., a glass panel), a semiconductor wafer (e.g., a silicon wafer), a wafer with multiple IC devices formed thereon, a single IC device, a substrate (e.g., ceramic, organic, metallic, etc.) with one or more coatings formed or disposed thereon, etc. The “coating” on the substrate may be formed of any material (organic, inorganic, metallic, etc.), have any thickness, and may (without limitation) be disposed on the substrate by any known method (e.g., deposited, sprayed, plated, grown on, etc.).

Figure 2:
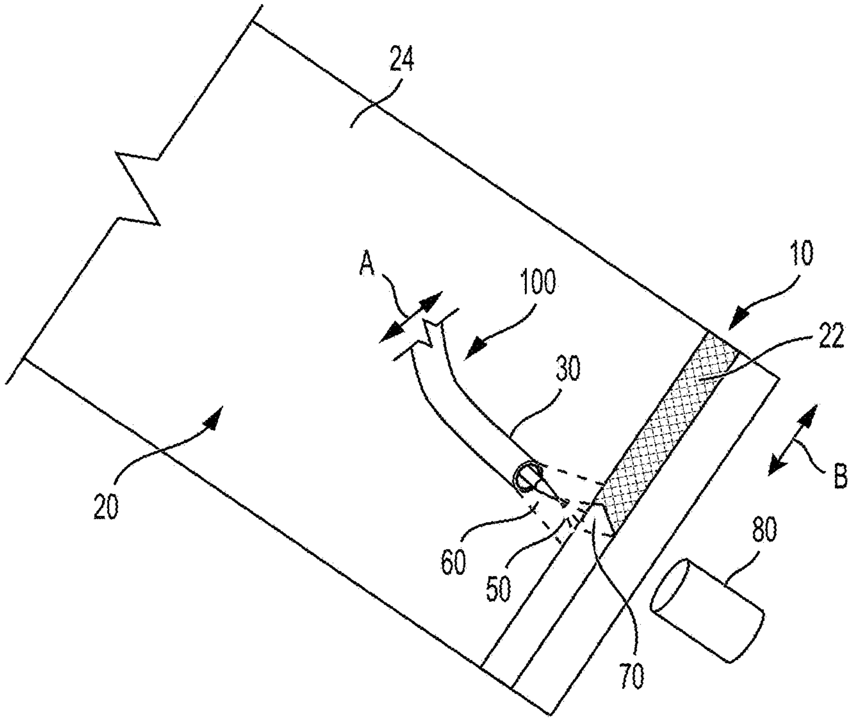
FIG. 2 is a schematic perspective view of an exemplary apparatus used to remove coatings from a panel.

FIGS. 1 and 2 are schematic illustrations of an exemplary apparatus 100 of the current disclosure that may be used to remove a coating 24 from an edge 10 of a substrate 20. FIG. 1 illustrates a side view and FIG. 2 illustrates a perspective view. In the discussion below, reference will be made to both FIGS. 1 and 2. A surface of substrate 20 may include one or more coatings deposited (or otherwise formed) thereon. For example, a first coating 22 may be deposited on the top surface of substrate 20 and a second coating 24 may be deposited on top of the first coating 22. In some embodiments, additional coatings may be deposited on top of the second coating 24. In general, any number of coatings may be deposited on substrate 20. In some embodiments, multiple coatings may be deposited one atop another on substrate 20 while in other embodiments substrate 20 may only have a single coating. Substrate 20 may include any type of substrate (e.g., semiconductor wafer, glass panel, etc.) and the first and second coatings 22, 24 may include any organic, inorganic, or metallic material. A non-limiting list of materials that may be deposited (or otherwise formed in any order) on substrate 20 may include, for example, silicon, silicon dioxide, silicon nitride, silicon carbide, polyamide, dielectric material(s), copper, aluminum, tungsten, tungsten carbide, tungsten nitride, titanium, titanium nitride, tantalum, aluminum, other metals, etc. Apparatus 100 may be used to remove one or more of the coatings 22, 24 from any region (e.g., one or more of the edges 10) of substrate 20. Although not a requirement, in some embodiments, the process of coating removal may include a single one or a combination of, for example, etching and ablation.

For the sake of brevity, the use of apparatus 100 to remove the top-most coating (e.g., second coating 24) from an edge 10 of an exemplary substrate 20 in the form of a rectangular glass panel with a first coating 22 made of titanium (Ti) and a second coating 24 made of copper (Cu) will be described below. However, this configuration is only exemplary, and embodiments of the disclosed apparatus 100 may be used to remove any desired coating(s) from any type of substrate.

Figure 3:
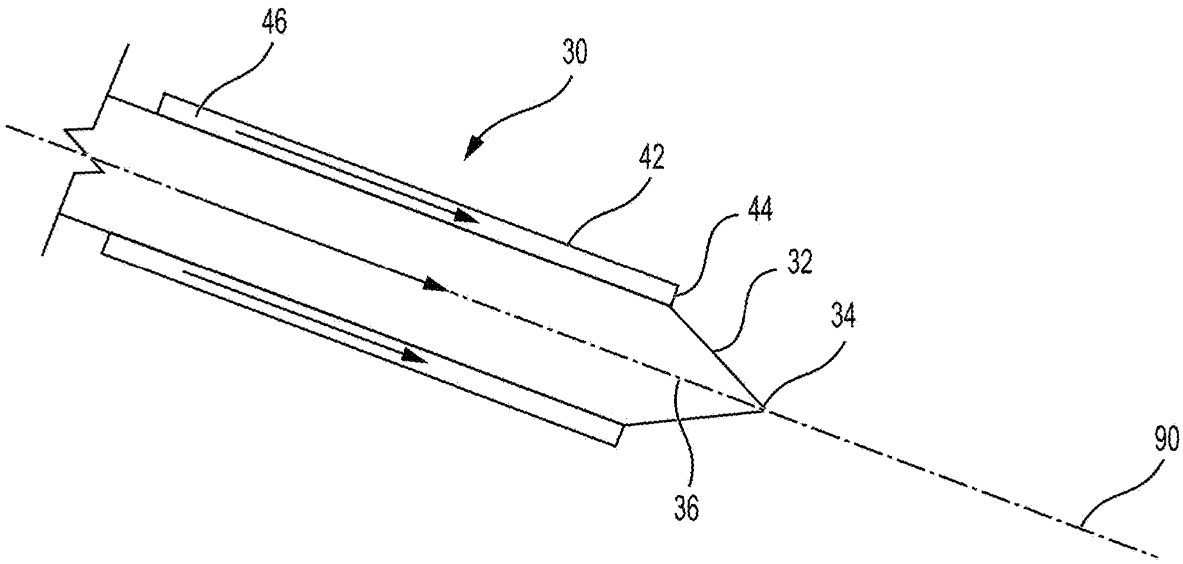
FIG. 3 is an illustration of an exemplary nozzle of the apparatus of FIG. 1.

Apparatus 100 may be used to direct a stream or a spray of a chemical composition on a desired edge 10 of the substrate 20 through a nozzle 30. FIG. 3 is a schematic illustration of an exemplary nozzle 30 that may be used with apparatus 100. As illustrated in FIG. 3, nozzle 30 includes a pair of co-axially arranged conduits—an inner conduit 32 and outer conduit 34. The inner and outer conduits 32, 34 may extend along a longitudinal axis 90 at the distal end of the nozzle 30. In some embodiments, the nozzle 30 may be a substantially linear component and its inner and outer conduits 32, 34 may extend linearly along the longitudinal axis 90 from the proximal to the distal end of the nozzle 30. However, this is not a requirement. In some embodiments, as illustrated in FIG. 2, the nozzle 30 may be curved and a small section at the distal end, or a tangent at the distal end, may extend along the longitudinal axis 90 such that fluid exits the nozzle 30 along the longitudinal axis 90. Inner conduit 32 includes a channel 36 configured to direct a liquid (or a chemical composition) therethrough, and an orifice 34 at the distal end that is configured to discharge (or spray a stream of) the liquid on the substrate 20. An annular channel 46 may be defined between the outer wall of the inner conduit 32 and the inner wall of the outer conduit 42. The annular channel 46 may be configured to direct a gas stream around the liquid stream exiting the orifice 34 through an annular opening 44 at the distal end of the outer conduit 42. The gas stream exiting the annular opening 44 surrounds (e.g., forms a shroud around) the liquid stream from the orifice 34 and assists in focusing the liquid stream on a concentrated area of the substrate 20.

In general, any type of a liquid chemical composition may be directed through the inner conduit 32. Typically, the type of liquid may depend on the application (e.g., the coating to be removed). For example, in some embodiments when a copper coating is to be removed from substrate 20, the chemical composition used may be based on one or more (e.g., a combination) of: $H_2O_2/H_2SO_4$; $SPS/H_2SO_4$; $CuCl_2$; a combination of different proportion of any of the above chemistries. In some embodiments, when a titanium coating is to be removed, the chemical composition directed through the inner conduit 32 may be based on one or more of: $H_2O_2/H_2SO_4$; TechniEtch™ TBR19 concentrate (TBR 19)/ $H_2O_2$; a combination of different proportion of any of the above chemistries. In some embodiments, the chemical composition may provide high selectivity to different coatings and other materials that may be present in the substrate 20 (e.g., Si, EMC, Polyimide, $SiO_2$, etc.). For example, in an embodiment where apparatus 100 is used to remove copper film deposited over, for example, titanium film on a processed semiconductor substrate 20 (that includes materials such as polyamide, $SiO_2$, etc.), the applied chemical composition may selectively remove copper without affecting (or with minimal effect on) the other materials.

It should be emphasized that the compositions described above are only exemplary and any liquid may be directed to the substrate 20 through the inner conduit 32. Similarly, any type of a gas (e.g., air, nitrogen, an inert gas, etc.) may be directed to the substrate 20 through the outer conduit 42. In some embodiments, the gas directed through the outer conduit 42 may be air irrespective of the type of liquid directed through the inner conduit 32. In some embodiments, the type of gas may depend on the type of liquid used. The coating (e.g., second coating 24) may be removed by the liquid chemical composition by, for example, ablation, etching, or a combination of etching and ablation. In some embodiments, the liquid chemical composition discharged through the nozzle 30 may be heated. It is also contemplated that, in some embodiments, the gas discharged through the nozzle 30 may also be heated. The apparatus 100 may include one or more heaters configured to heat the liquid and/or gas directed to the substrate 20 through the nozzle 30. In some embodiments, these heaters may be coupled to the nozzle 30. In some cases, heating the liquid chemical composition (and/or the gas) may assist in coating removal.

Figure 4:
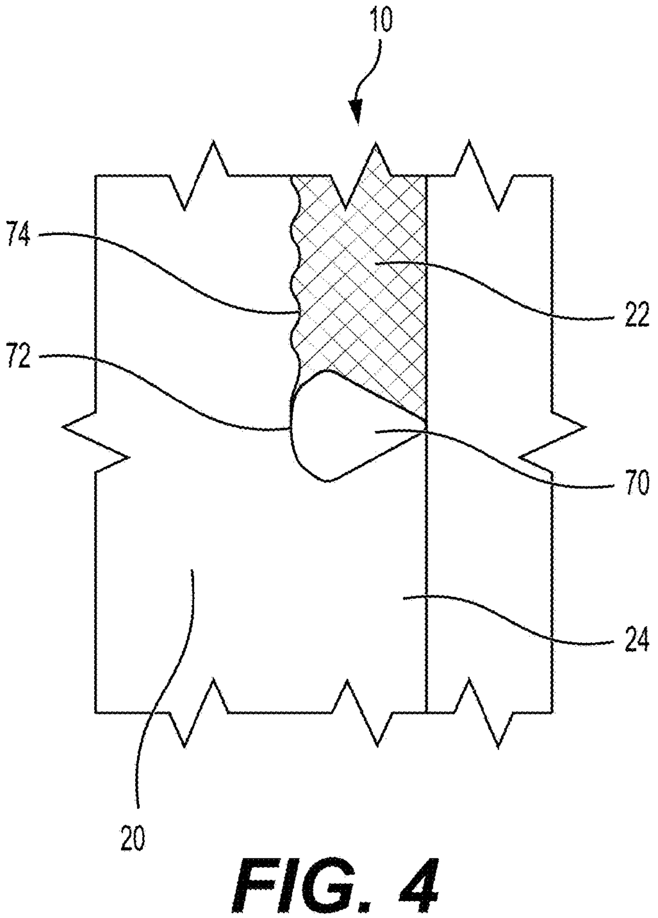
FIG. 4 is an illustration of an exemplary tear drop shaped liquid droplet created by the apparatus of FIG. 1.

With reference to FIGS. 1 and 2, when a liquid stream 50 is directed at the substrate 20 through nozzle 30, the gas flow 60 around the liquid stream 50 streamlines and concentrates the flow of the liquid stream 50 and the shape of the liquid droplets 70 impinging on the second coating 24. The liquid droplets 70 impinging on the substrate 20 assists in removing the second coating 24 from the substrate surface. The distance (d) of the nozzle 30 from the substrate surface, the pressure ($P_l$) of the liquid directed through the inner conduit 32, the pressure ($P_g$) of the gas directed through the outer conduit 42, and the angle (θ) of inclination of the longitudinal axis 90 of nozzle 30 may be adjusted such that the liquid droplets 70 that impinge on the substrate surface have a tear-drop shape. As illustrated in FIG. 4, a tear-drop shaped liquid droplet 70 may be curved (curved end 72) at one end and substantially pointed at the opposite end. The relatively large radius of the curved end 72 assists in removing the second coating 24 while forming a sharp edge 74.

It should be noted that although FIGS. 1-3 illustrate the inner conduit 32 as extending further than the outer conduit 42 such that the orifice 34 extends further along the longitudinal axis 90 than the annular opening 44, this is only exemplary and not a requirement. In some embodiments, the orifice 34 and the annular opening 44 may be disposed at substantially the same location along the longitudinal axis 90. It should also be noted that, although these figures illustrate the inner and outer conduits 32, 42 as being centered about the longitudinal axis 90 with a constant dimension (e.g., width) annular channel 46 extending along the length of the nozzle 30, this is only exemplary. In some embodiments, the width of the annular channel 46 may vary along the length of the nozzle 30. Inner and outer conduits 32, 34 may be made of any material (e.g., metal, glass, plastic, etc.) and may have any size and shape. In some embodiments, the material used to form the inner and outer conduits 32, 34 may depend on the fluids (e.g., chemical composition and gas) directed through these conduits, and the size and shape of these conduits may depend on the size of the region from which a coating is to be removed.

Figure 8A:
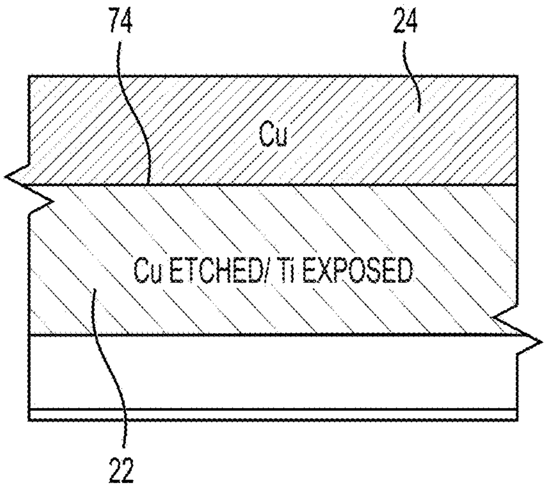
FIGS. 8A and 8B illustrates a sharp edge formed after removal of an exemplary coating from an edge of a substrate.
Figure 8B:
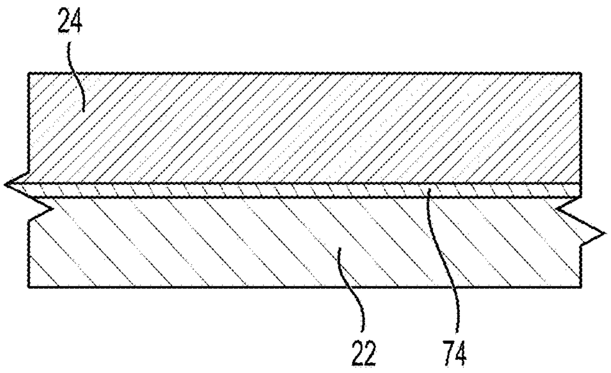

With reference to FIG. 1, in some embodiments, apparatus 100 or nozzle 30 may be configured such that the angle (θ) of inclination of the nozzle 30 may be varied. In general, the angle (θ) may be varied between about 0-180°. In general, the angle (θ) may be varied between about 10-180°, about 20-90° or about 30-60°. Apparatus 100 or nozzle 30 may also be configured to enable nozzle 30 to translate along the substrate surface. Additionally, apparatus 100 or nozzle 30 may also be configured to vary distance (d) and pressures $P_l$ and/or $P_g$. In some embodiments, only one of $P_l$ and $P_g$ may be varied. It is also contemplated that, in some embodiments, both $P_l$ and $P_g$ may have the same value. Although not a requirement, in some embodiments, distance (d) may be varied between about 1-50 mm or between about 10-20 mm, and one of both of $P_l$ and $P_g$ may be varied between 10-60 psi or between about 15-25 psi. The values of these parameters (e.g., θ, d, $P_l$, $P_g$) used may depend upon the application (type and size of substrate, type and thickness of films, etc.). In general, one or more of these parameters may be varied to produce liquid droplets of a desired shape that removes a coating in an efficient manner. FIGS. 8A and 8B show an exemplary sharp edge 74 formed upon the removal of a copper coating (e.g., second coating 24) from an edge of a panel coated with copper over titanium (e.g., first coating 22) using apparatus 100. FIG. 8B is an enlarged view of a portion of the edge circled in FIG. 8A. As illustrated in FIG. 8B, adjusting one or more of the parameters (e.g., θ, d, $P_l$, $P_g$) completely removes the copper coating from the edge and produces a sharp edge 74.

Figure 5A:
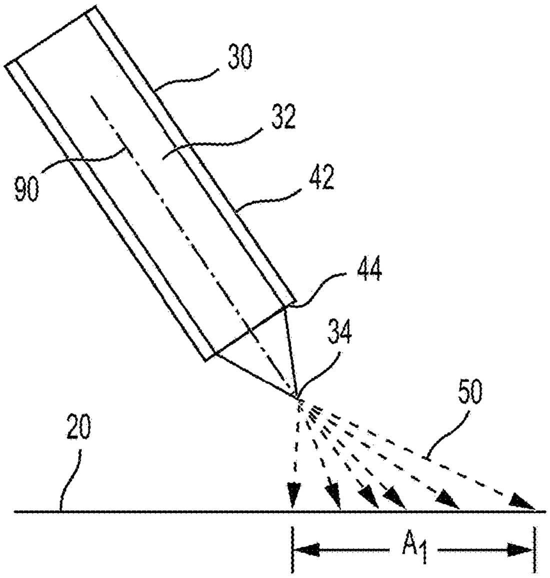
FIGS. 5A and 5B are simplified depictions illustrating an exemplary method of coating removal by the apparatus of FIG. 1.
Figure 5B:
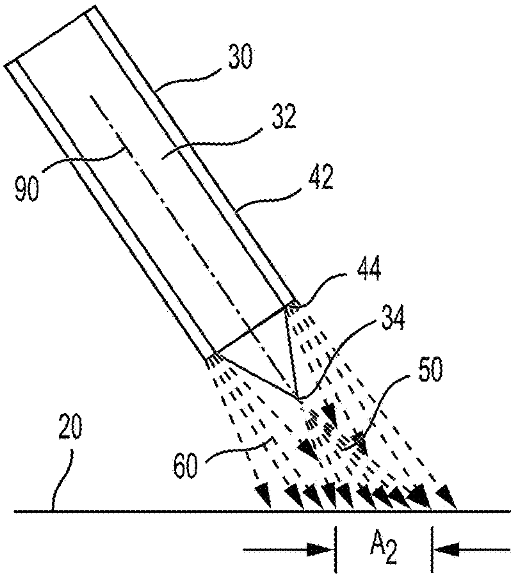

FIGS. 5A and 5B schematically illustrate the effect of providing gas flow 60 around the liquid stream 50 from nozzle 30. As illustrated in FIG. 5A, without the gas flow 60, the liquid stream 50 exiting the orifice 34 will impact larger area ($A_1$) on the surface of the coated substrate 20. As illustrated in FIG. 5B, the gas flow 60 exiting the nozzle 30 through the annular opening 44 surrounds the liquid stream 50 and causes the liquid stream 50 to impact a smaller and more well defined area ($A_2$) of the coated substrate 20. Moreover, the gas flow 60 results in liquid droplets of a desirable shape (e.g., a tear-drop shaped, etc.) to remove coatings with a sharp edge. In some embodiments, the gas flow 60 around the liquid stream 50 extends all the way from the distal end of the nozzle 30 to the substrate surface. However, this is not a requirement. In some embodiments, the selected parameters may cause the surrounding gas flow 60 to terminate before the substrate surface.

When apparatus 100 is used to remove a coating (e.g., second coating 24) on substrate 20, as represented by arrow A in FIG. 2, the nozzle 30 may be translated (or moved) to trace a path using the liquid stream 50 on the substrate surface. The second coating 24 may be removed along this path. The relatively large radius of the curved end 72 of the tear-drop shaped liquid droplets 70 (see FIG. 4) assists in forming a sharp edge 74 of the retained coating on the side(s) of the traced path. Additionally, or alternatively, in some embodiments, as represented by arrow B in FIG. 2, the substrate 20 may be translated such that the liquid stream 50 from nozzle 30 traces a path on the substrate surface. In some embodiments, only one of the substrate 20 or the nozzle 30 may be translated, while in other embodiments both the substrate 20 and the nozzle 30 may be translated to trace a path using the liquid stream 50 on the substrate surface. In some embodiments, the nozzle 30 and the substrate 20 may be translated in the same direction, while in other embodiments the nozzle 30 and the substrate 20 may be translated in opposite directions. As illustrated in FIG. 1, apparatus 100 may also include an outlet conduit 80 configured to remove the liquid chemical composition (and coating debris) after impinging on the substrate 20. In some embodiments, suction may be provided though conduit 80 to effectively drain the residual liquid along with the debris. Although a single outlet conduit 80 is illustrated, this is only exemplary. In some embodiments, multiple conduits 80 may be provided to effectively remove the residual liquid and debris.

Figure 6:
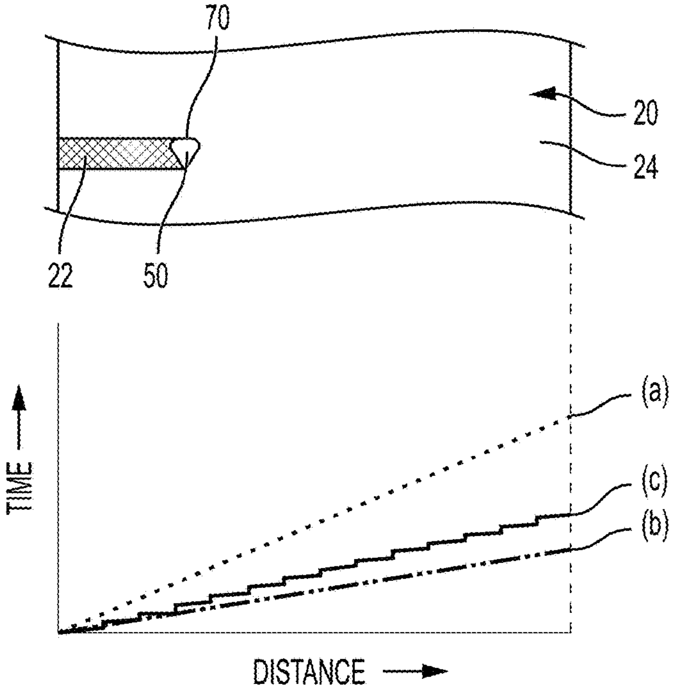
FIG. 6 is schematic illustration showing different exemplary methods of using the apparatus of FIG. 1 to remove a coating.

In some applications, the residence (or contact) time of the liquid chemical composition (e.g., the liquid stream 50) with the coating may affect the quality of the coating removal. Residence time may be varied by controlling the speed at which the nozzle 30 and/or the substrate 20 translates to trace a path of the liquid stream 50 on the substrate surface. For example, with reference to FIG. 6, increasing the time that the liquid stream 50 takes to trace a path across the substrate, as illustrated using curve (a), increases the residence time of the liquid stream 50 with the coating. Similarly, decreasing the time to trace the path, as illustrated using curve (b), decreases the residence time. Residence time may also be increased by tracing a path across the substrate 20 in a stepped manner as illustrated using curve (c). It is also contemplated that, in some embodiments, the liquid stream 50 may trace a same path across the substrate surface multiple times (e.g., traverse back and forth) to adequately remove the coating in the path.

Figure 9:
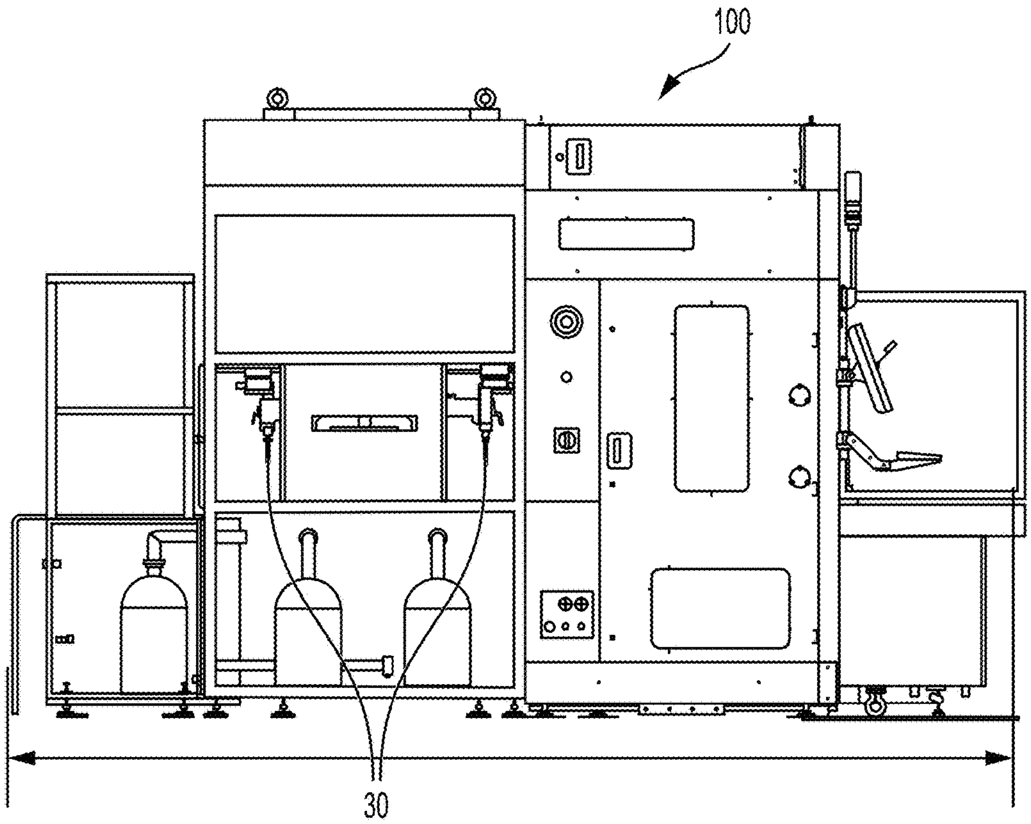
FIG. 9 illustrates an exemplary apparatus with a nozzle of FIG. 1.

It should be noted that although a single nozzle 30 of apparatus 100 is described, this is not a limitation. In some embodiments, as illustrated for example in FIG. 9A, apparatus 100 may include multiple nozzles 30. Each of these multiple nozzles 30 may operate in a similar manner as described above. In some embodiments, one or more nozzles 30 may be arranged at different locations of the substrate (e.g., at opposite side, edges, etc.) to simultaneously remove coating from multiple regions of a coated substrate.

Figure 7:
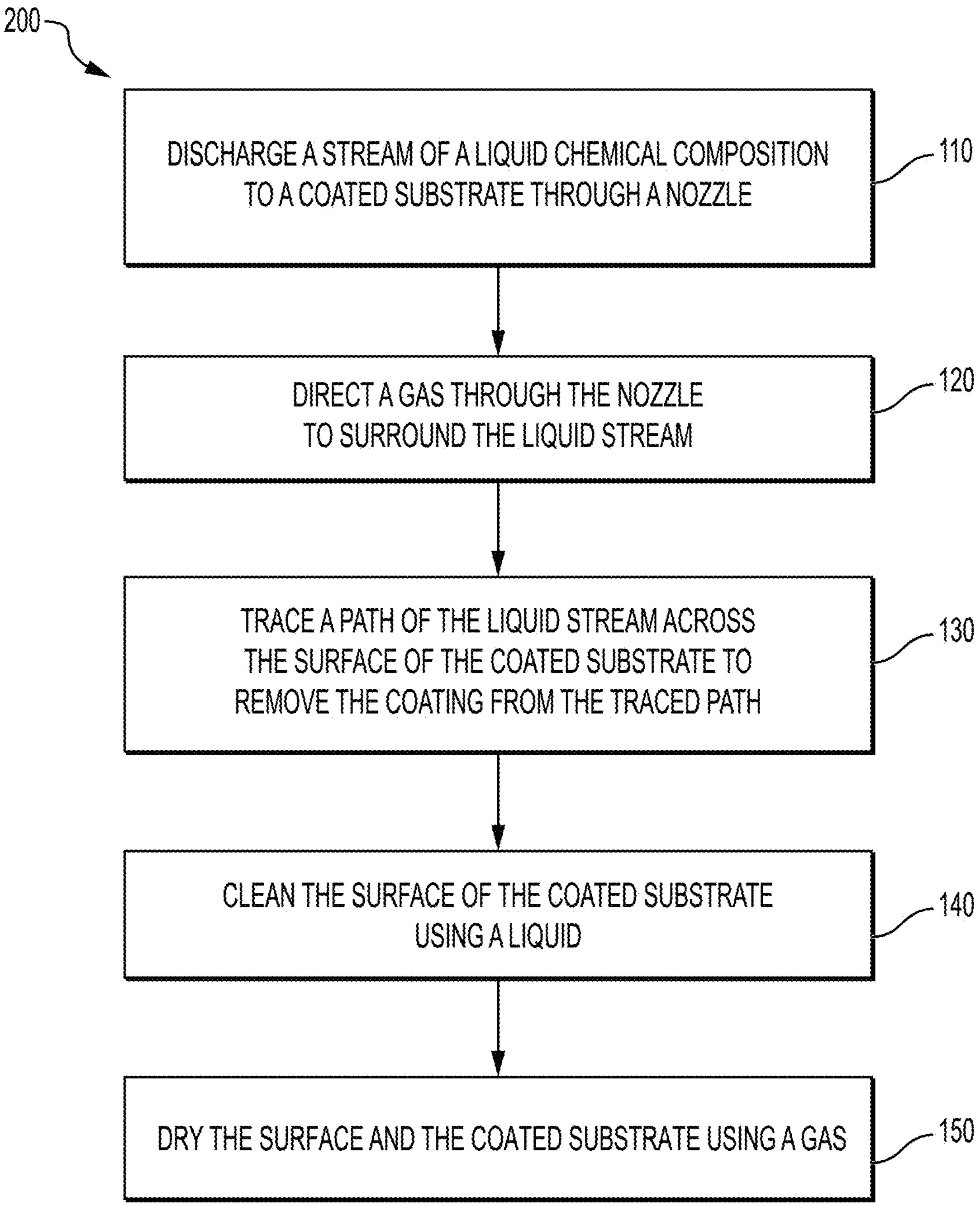
FIG. 7 is a flow chart illustrating an exemplary method of using the apparatus of FIG. 1.

FIG. 7 is a flow chart that illustrates an exemplary method 200 of removing a coating from the edge of a substrate surface using apparatus 100. With reference to FIGS. 1-4, apparatus 100 is positioned such that nozzle 30 is disposed at a distance (d) from the top surface of a coated substrate 20 and its longitudinal axis 90 makes an angle (θ) with the top surface of the substrate 20. A liquid chemical composition is passed through the inner conduit 32 of the nozzle 30 to direct a liquid stream 50 at the substrate 20 through orifice 34 (step 110). A gas is directed through the outer conduit 42 of the nozzle 30 to flow out through annular opening 44 and form a gas flow 60 that surrounds the liquid stream 50 (step 120). The nozzle 30 and/or the substrate 20 is translated such that the liquid stream 50 with its surrounding gas flow 60 traces a path across the substrate surface (step 130). As the liquid stream 50 traverses the path, it interacts with the coating and removes it. It some embodiments, one or more of the distance (d), angle (θ), pressure ($P_l$) of the liquid directed through the inner conduit 32, and the pressure ($P_g$) of the gas directed through the outer conduit 42 may be varied to optimize the coating removal process. In some embodiments, substrate surface may be cleaned (e.g., using a different liquid) after step 130 (step 140). For example, in some embodiments, after step 130, a chemical composition (e.g., water, IPA, citric acid, etc.) may be directed on the surface of the substrate 20 through the nozzle 30 (e.g., through inner conduit 32) to clean (e.g., remove residues of the chemical composition used in step 130) the substrate surface. Additionally, or alternatively, in some embodiments, the substrate surface may be dried (e.g., using a hot gas (e.g., air, nitrogen, etc.) after coating removal in step 130 (step 150). For example, in addition to or as an alternative to cleaning the substrate surface (i.e., step 140) after coating removal (i.e., step 130), a gas (e.g., hot air, hot nitrogen, etc.) may be directed to the substrate surface (e.g., through the outer conduit 42 of nozzle 30) to dry the substrate surface. It should be noted that steps 140 and 150 and one of both of these steps may be omitted in some embodiments. In general, the above described steps may be performed in any order (e.g., step 120 may be performed before or simultaneously with step 110, etc.). Moreover, the method may include additional steps not illustrated in FIG. 7.

Although the current disclosure is described as being used to remove a coating from an edge (or the edge zone coating) of a substrate, this is only exemplary. For example, apparatus 100 may be used to remove a single or multiple coatings (e.g., multi-layer coatings) from any region (e.g., center, side, etc.) of a coated substrate. Persons of ordinary skill in the art would recognize that the disclosed apparatus can be used for any application (e.g., to remove paint from the surface of a component, a metallic or polymeric coating from the surface of a ceramic/organic substrate or a semiconductor wafer, etc.). Furthermore, although in the description above, some features were disclosed with reference to specific embodiments, a person skilled in the art would recognize that this is only exemplary, and the features are applicable to all disclosed embodiments. Other embodiments of the apparatus, its features and components, and related methods will be apparent to those skilled in the art from consideration of the disclosure herein.

What is claimed is:

1. An apparatus to remove at least a portion of a coating from a coated surface of a substrate, comprising:

at least one nozzle extending from a proximal end to a distal end, wherein at least a distal end portion of the at least one nozzle extends along a longitudinal axis, and wherein the at least one nozzle includes, an inner conduit having an orifice at the distal end, wherein the inner conduit is configured to direct a liquid stream through the orifice to impinge on the coated surface, an outer conduit coaxially arranged about the inner conduit and defining an annular opening between the inner conduit and the outer conduit, wherein the outer conduit is configured to direct a gas through the annular opening to surround the liquid stream emanating from the orifice, and wherein the inner conduit extends further along the longitudinal axis than the outer conduit to create a gap between the orifice and the annular opening along the longitudinal axis such that at least a portion of the liquid stream emanating from the orifice impinges on the coated surface without intermixing with the gas emanating from the annular opening; and an outlet port configured to direct liquid from the liquid stream away from the substrate after the liquid stream impinges the coated surface.

2. The apparatus of claim 1, further including a heater configured to heat the liquid stream exiting the orifice.

3. The apparatus of claim 1, wherein the longitudinal axis inclined at an angle θ with the coated surface.

4. The apparatus of claim 3, wherein the apparatus is configured to vary the angle θ between 0-180°.

5. The apparatus of claim 4, wherein the apparatus is configured to vary the angle θ between 30-60°.

6. The apparatus of claim 1, wherein the apparatus is configured to vary a pressure of the liquid stream exiting through the orifice.

7. The apparatus of claim 1, wherein the apparatus is configured to vary a pressure of the gas exiting through the annular opening.

8. The apparatus of claim 1, wherein the apparatus is configured to heat the gas exiting through the annular opening.

9. The apparatus of claim 1, wherein the apparatus is configured to translate the nozzle to trace a path using the liquid stream on the coated surface.

10. An apparatus to remove at least a portion of a coating from a coated surface of a substrate, comprising:

a nozzle extending along a longitudinal axis and including, an inner conduit configured to direct a liquid stream through an orifice to impinge on the coated surface such that liquid droplets of the liquid stream that impinges on the coated surface have a tear drop shape, wherein the tear drop shape is a shape with one end curved and an opposite end pointed; and an outer conduit coaxially arranged about the inner conduit and configured to direct a gas through an annular opening between the inner conduit and the outer conduit to surround the liquid stream emanating from the orifice, wherein the gas is directed through the annular opening such that the liquid stream that impinges on the coated surface impacts a first area of the coated surface smaller than a second area, and wherein the second area is an area of the coated surface that would be impacted by the liquid stream if the liquid stream is directed through the orifice without the gas being directed through the annular opening.

11. The apparatus of claim 10, wherein the orifice is spaced apart from the annular opening along the longitudinal axis such that at least a portion of the liquid stream emanating from the orifice impinges on the coated surface without intermixing with the gas emanating from the annular opening.

12. The apparatus of claim 10, further including a heater configured to heat the liquid stream exiting the orifice.

13. The apparatus of claim 10, wherein the longitudinal axis inclined at an angle θ with the coated surface, and wherein the apparatus is configured to vary the angle θ between 0-180°.

14. The apparatus of claim 10, wherein the apparatus is configured to vary a pressure of the liquid stream exiting through the orifice.

15. The apparatus of claim 10, wherein the apparatus is configured to vary a pressure and vary a temperature of the gas exiting through the annular opening.

16. The apparatus of claim 10, wherein the apparatus is configured to translate the nozzle to trace a path using the liquid stream on the coated surface.

17. An apparatus to remove a coating from a coated surface of a substrate, comprising:

a nozzle extending along a longitudinal axis, the nozzle including, an inner conduit having an orifice configured to release a liquid jet that impinges on the coated surface and removes at a portion of the coating by ablation, etching, or a combination of etching and ablation, and an outer conduit coaxially arranged about the inner conduit and defining an annular opening between the inner conduit and the outer conduit, wherein the outer conduit is configured to direct a gas through the annular opening to surround the liquid jet emanating from the orifice such that at least a portion of the liquid jet impinges on the coated surface without intermixing with the gas emanating from the annular opening.

18. The apparatus of claim 17, wherein the inner conduit extends further along the longitudinal axis than the outer conduit such that the orifice and the annular opening are spaced apart along the longitudinal axis.

19. The apparatus of claim 17, wherein the longitudinal axis inclined at an angle θ with the coated surface, and wherein the apparatus is configured to vary the angle θ between 0-180°.

20. The apparatus of claim 17, further including a heater configured to heat the liquid jet emanating from the orifice.

* * * * *